United States Patent
Davis et al.

[15] 3,703,311
[45] Nov. 21, 1972

[54] TENT CAMPING TRAILER

[72] Inventors: Robert W. Davis, 4310 Goldfinch, Houston, Tex. 77035; Karl L. Dahlstrom, 942 Ashwood, Lewisville, Tex. 75067

[73] Assignee: said Davis, by said Dahlstrom

[22] Filed: April 16, 1971

[21] Appl. No.: 134,582

[52] U.S. Cl. .............................296/23 R, 135/1 A
[51] Int. Cl. .............................................B60p 3/34
[58] Field of Search .....296/23 R; 135/1 A, 2 A, 3 A, 135/4 A, 5 A

[56] References Cited

UNITED STATES PATENTS 3,489,452  1/1970  Plante......................296/23 R
3,325,206  6/1967  Carlson.....................296/23 R Primary Examiner—P. Goodman
Attorney—Bill B. Berryhill

[57] ABSTRACT

A tent camping trailer comprising a trailer frame mounted on a wheel and axle assembly and an enclosure having side and end walls and a top wall, pivotally attached along one side to one side of the frame, allowing the enclosure to be swung from a traveling position on the frame to a camping position along side the frame. A collapsible tent covering may be attached to the frame and enclosure with support members for erection of the covering when the enclosure is moved to the camping position. The enclosure top wall may be pivotally connected along one side of the enclosure.

10 Claims, 7 Drawing Figures

Robert W. Davis
Karl L. Dahlstrom
INVENTORS

BY
Bill B Berryhill
ATTORNEY

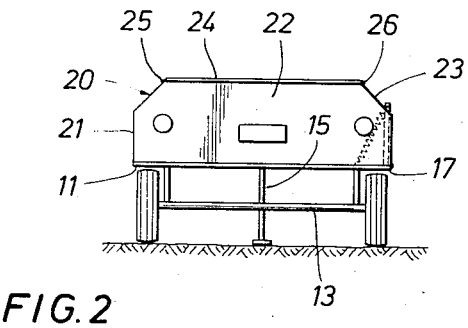
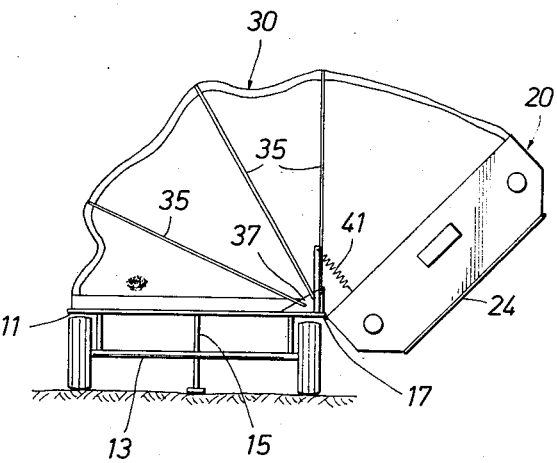
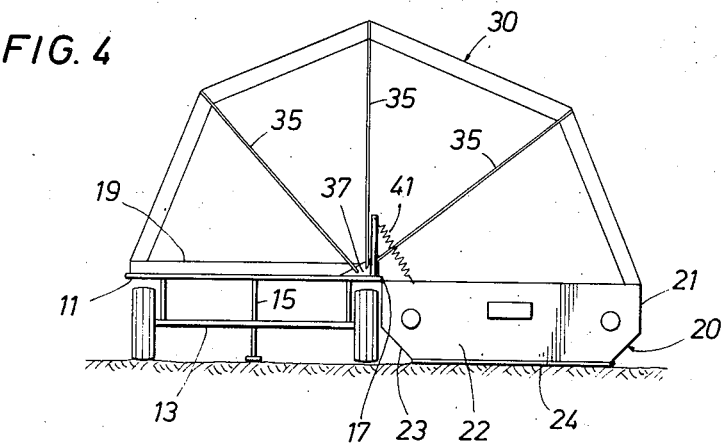
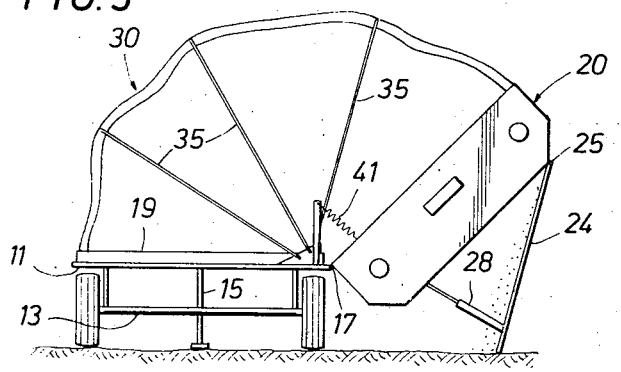
Robert W. Davis
Karl L. Dahlstrom
INVENTORS
BY
Bill B Berryhill
ATTORNEY

TENT CAMPING TRAILER

BACKGROUND OF THE INVENTION

1. Field of the Invention

The present invention relates generally to tent camping trailers and more particularly to an improved design requiring a minimum of effort and time to set up and take down.

2. Description of the Prior Art

Traveling and camping have become extremely popular pastimes in recent years. Consequently, there has been a great deal of development in tents and related camping gear. One of the most popular items of equipment in this field is the camping trailer which is easily transported from place to place by an automobile. When the camping site is reached, the trailer is converted to a camping tent. For an example of prior art in this field, see the following U.S. Pat. Nos. 2,459,026 — Hardy; 2,513,411 — Heil; 2,549,266 — Troden et al.; and 3,323,827 — Lundby.

Some of the prior art trailer designs utilize the trailer top or enclosure as a portion of the tent floor when unfolded. This offers the advantage of having a solid floor and providing some protection against hostile insects and ground vermin. However such a floor or enclosure may trap air when the tent is again folded for travel, increasing take down time. Furthermore, when acting as a floor, the enclosure sometimes becomes rather dirty and is relatively hard to clean. The trailer top is also quite heavy since it is usually made of wood or metal.

SUMMARY OF THE INVENTION

The tent camping trailer of the present invention utilizes the trailer top as a portion of the tent floor and base enclosure by hinging the trailer top along one side of the trailer bed. Thus, the advantages of a solid floor and base enclosure are attained. A compensating spring assembly attached to the trailer enclosure aids in both setting up and taking down the tent. In addition, the top of the trailer enclosure, which becomes the tent floor, is hinged along one side of the enclosure allowing it to be opened when the tent is taken down, providing a means of cleaning the tent floor and allowing escape of air when the tent is folded into its trailering position. Furthermore, it allows access to the trailer enclosure while in the trailering position. Other objects and advantages of the invention will become apparent from the following description and attached drawings.

BRIEF DESCRIPTION OF THE DRAWINGS

In the description which follows reference will be made to the attached drawings in which:

FIG. 2 is a rear elevation view of the embodiment of FIG. 1 shown in its traveling position;

FIG. 3 is a rear elevation view of the same embodiment showing the tent covering (with a portion of the end removed) and the trailer enclosure as they are being moved toward camping position;

FIG. 4 is a rear elevation view showing the same embodiment in its tent camping position;

FIG. 5 is an end elevation view showing the tent covering and trailer enclosure as they are being returned to the traveling position after camping;

DESCRIPTION OF A PREFERRED EMBODIMENT

Figure 1:
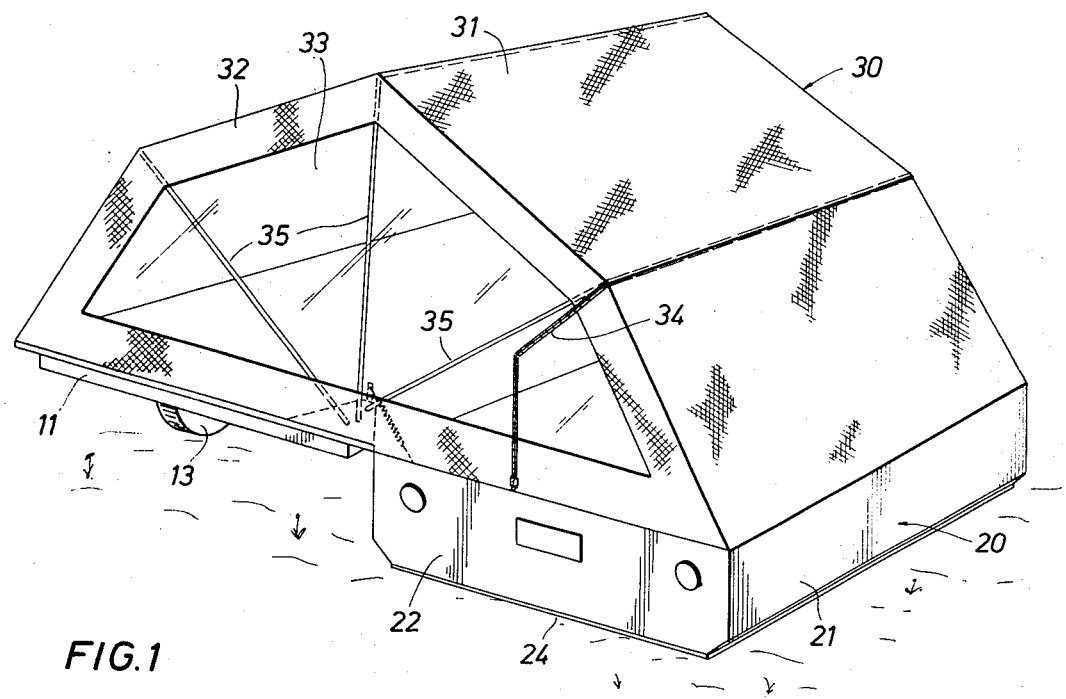
FIG. 1 is a perspective view of a preferred embodiment of the invention shown in its camping position as viewed from a rear corner.

Referring now to the drawings, a preferred embodiment of the tent camping trailer will be described. The trailer includes a trailer frame or bed 11 mounted on a wheel and axle assembly 13. The trailer may comprise a conventional trailer hitch (not shown) and jack stand 15. Attached along one side of bed 11 by a hinge member 17 is trailer enclosure 20. The trailer enclosure may comprise side and end walls 21, 22, 23 and a top 24. The top 24 is hinged for pivoting along the side of the enclosure walls at 25. A latch 26 may be provided at the other side to prevent the top from coming open when not desired.

Figures 6, 7:
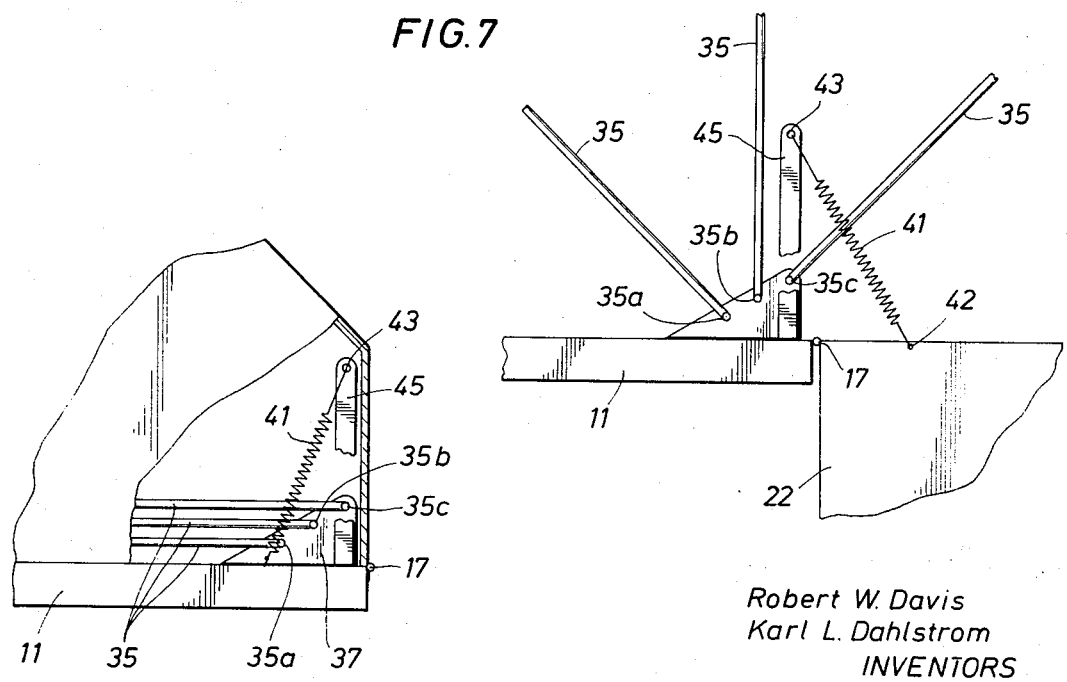
FIG. 6 is a detailed elevation, partially in section, showing the attachment of tent support members and spring compensation apparatus, in the trailering or traveling position.
FIG. 7 is an elevation detail showing generally the same apparatus of FIG. 6, but in the camping position.

Attached along one side of trailer bed 11, one side of the enclosure 20, and both ends of the bed and enclosure, is a folded tent covering 30 comprising a roof portion 31 and end walls 32. The end walls may be provided with windows of transparent material 33 and a door or access of any suitable type. The zipper member 34 provides the access for this particular embodiment. To provide support for the tent covering 30 when it is in the set up or erected camping position, a plurality of support members 35 may be provided. These support members 35 are generally U-shaped and mounted for pivoting about their ends on axii parallel to the plane of trailer bed 11. To allow these support members 35 to lie flat on top of each other in the collapsed or traveling position, their pivoting ends are carried on a pair of vertical plates 37, one at each end of the trailer, in such a manner that their pivoting axii 35a, 35b, and 35c (see FIGS. 6 and 7) lie in an inclined plane relative to the trailer bed 11.

To convert the tent camping trailer from the traveling position shown in FIG. 2 to the tent camping position of FIGS. 1 and 4, the trailer enclosure 20 is swung from the hinge 17 approximately 180° until the top 24 reaches ground level as in FIG. 4. During the course of swinging the enclosure 20 toward ground position the tent covering and its support members 35 begin moving into position, as shown in FIG. 3, until they reach the final erected position of FIG. 4. To aid in swinging the enclosure 20 into position a compensating spring arrangement may be provided. The spring 41 may be attached at one end 42 (see FIGS. 6 and 7) to enclosure end wall 22 and at the other end 43 to an arm member 45 attached to the trailer bed 11. Thus, a lifting force would be applied to enclosure 20 in both the trailering position and the tent camping position, aiding in both the setting up and taking down operations.

When the trailer is in the tent camping position of FIGS. 1 and 4, the enclosure top 24 becomes the walking floor of the tent. And the enclosure walls 21, 22, 23 form a continuous protective enclosure about the base of the tent. A mattress 19 may be provided on the trailer bed 11 for an above the ground sleeping area.

To return the tent camping trailer to the traveling position, the enclosure 20 is lifted and pivoted about hinge 17 toward the trailering position, as shown in FIG. 5. As this is done, the top or tent floor 24 is allowed to swing away from the enclosure 20, pivoting around hinge 25 and seeking the vertical position, allowing soil and debris to fall to the ground for easy pickup and disposal. The top 24 may safely be allowed to rest upon the ground and provide a support for the enclosure 20 during cleaning operations. To assure that it stays in this position a safety linkage 28 of any suitable design may be provided. Once the tent floor has been cleaned the enclosure 20 may be further pivoted toward the traveling position. The linkage 28 allows the top 24 to remain open as the enclosure 20 is returned to the traveling position. This serves the important function of allowing air, trapped inside the tent, to escape as the tent covering is folded back into its traveling position. When all other components are in position, the top 24 can be returned to its traveling position. In addition to allowing easy cleaning of the tent floor and escape of air during take down operations, the top 24 also provides access to the enclosure 20 while in the trailering position. Thus additional goods and equipment may be stored for transportation and easy access.

As can be seen from the foregoing description, the present invention provides an improved means of setting up and taking down a tent camping trailer. Its ease of operation and simple construction combine to provide a unit ideally suited for today's camping enthusiasts.

Although only one embodiment of the invention has been described herein, many variations will become apparent to those skilled in the art. It is therefore intended that the scope of the invention be limited only by the claims which follow.

We claim:

1. A tent camping trailer comprising:
   a. A trailer frame mounted on a wheel and axle assembly;
   b. An enclosure mounted on said frame having side and end walls and a top wall, a first side of said enclosure being pivotally attached along a first side of said frame whereby said enclosure may be swung from a traveling position on said frame to a camping position alongside said frame in which said top wall engages the ground and forms a floor for a tent structure and said enclosure side and end walls form a continuous wall about the base of said tent structure; and
   c. a collapsible tent covering attached to a second side of said enclosure, a second side of said frame and both ends of said frame and enclosure and provided with collapsible support members attached to said frame, whereby said tent covering will be erected to complete said tent structure when said enclosure is swung to said camping position;
   d. said top wall being pivotally attached along one side of said enclosure to allow access to said enclosure in said traveling position, without disturbing said tent covering, and to allow escape of air from said tent structure when said enclosure is returned from said camping position to said traveling position.

2. A tent camping trailer as set forth in claim 1, characterized by a spring attached to said enclosure and said frame biasing said enclosure toward said camping position when in said traveling position and toward said traveling position when in said camping position.

3. A tent camping trailer as set forth in claim 2 in which one end of said spring is attached to an arm member which is attached to said frame at a point near said first side of said frame, the opposite end of said spring being attached to one of said enclosure end walls at a point away from said first side of said enclosure so that when said enclosure is moved from said traveling to said camping position the biasing of said spring shifts from a clockwise direction to a counter-clockwise direction relative to the pivot axis between said enclosure and said frame.

4. A tent camping trailer as set forth in claim 1, characterized in that said support members comprise a plurality of generally U-shaped members the ends of which are carried on a pair of plates attached near said second side of said frame for pivoting about a plurality of axes lying in an inclined plane relative to said frame so as to allow said support members to lie flat on each other when in said traveling position.

5. A tent camping trailer as set forth in claim 1 in which said top wall is pivotally attached along said second side of said enclosure to permit support of said enclosure at an intermediate point between said camping and traveling positions.

6. A tent camping trailer comprising: a trailer frame mounted on a wheel and axle assembly; an enclosure, having side and end walls and a top wall, pivotally attached along one side to one side of said frame allowing said enclosure to be swung from a traveling position on said frame to a camping position in which said top engages the ground; a collapsible tent covering attached to another side of said enclosure, another side of said frame, and both ends of said frame and enclosure; and a plurality of support members pivotally attached to said frame and movable from a collapsed position on said frame in said traveling position to an erected position in said camping position to support said tent covering; characterized in that said top wall is pivotally attached to one side of said enclosure allowing access to said enclosure in said traveling position, without disturbing said tent covering, and allowing air to escape from said tent covering and enclosure when said enclosure is swung from said camping position to said traveling position.

7. A tent camping trailer as set forth in claim 6, characterized in that said support members comprise U-shaped members, the ends of which are mounted for pivoting about axes parallel to the sides of said frame and lying in a plane inclined from the horizontal plane.

8. A tent camping trailer as set forth in claim 6, characterized by a spring member attached to said enclosure and said frame, biasing said enclosure toward said camping position when in said traveling position and towards said traveling position when in said camping position.

9. A tent camping trailer as set forth in claim 6, characterized by a linkage means attached to said top allowing said top to be fastened in a pivoted position away from said enclosure.

10. A tent camping trailer as set forth in claim 6 in which said top wall is pivotally attached along a side of said enclosure opposite the side which is pivotally attached to said frame so that said top may engage the ground and serve to support said enclosure at an intermediate point between said camping and traveling positions.

* * * * *